US012769004B2

(12) United States Patent
Pekarovskiy et al.

(10) Patent No.: US 12,769,004 B2
(45) Date of Patent: Oct. 20, 2026

(54) METHOD FOR THE AT LEAST PARTLY AUTOMATED GUIDANCE OF A MOTOR VEHICLE

(71) Applicant: Robert Bosch GmbH, Stuttgart (DE)

(72) Inventors: Alexander Pekarovskiy, Kornwestheim (DE); Matthew Nimmo, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 384 days.

(21) Appl. No.: 18/246,217

(22) PCT Filed: Dec. 7, 2021

(86) PCT No.: PCT/EP2021/084613
§ 371 (c)(1),
(2) Date: Mar. 22, 2023

(87) PCT Pub. No.: WO2022/122738
PCT Pub. Date: Jun. 16, 2022

(65) Prior Publication Data
US 2024/0012151 A1 Jan. 11, 2024

(30) Foreign Application Priority Data
Dec. 9, 2020 (DE) ..................... 10 2020 215 537.2

(51) Int. Cl.
*G01S 17/931* (2020.01)
*B60W 30/08* (2012.01)
(Continued)

(52) U.S. Cl.
CPC ........... *G01S 17/931* (2020.01); *B60W 30/08* (2013.01); *B60W 60/0015* (2020.02); *G08G 1/168* (2013.01); *B60W 2554/4041* (2020.02)

(58) Field of Classification Search
CPC ..... B62D 15/0285; G01S 17/42; G01S 17/87; G01S 17/931; G08G 1/0116;
(Continued)

(56) References Cited

U.S. PATENT DOCUMENTS

2016/0318510 A1 11/2016 Hess
2018/0009477 A1 1/2018 Pla Rubio et al.
2020/0349838 A1 11/2020 Schuller et al.

FOREIGN PATENT DOCUMENTS

CN 111399498 A 7/2020
DE 102012015968 A1 3/2014
(Continued)

OTHER PUBLICATIONS

International Search Report for PCT/EP2021/084613, Issued Mar. 16, 2022.

*Primary Examiner* — Charles J Han
(74) *Attorney, Agent, or Firm* — Norton Rose Fulbright US LLP

(57) ABSTRACT

A method for the at least partly automated guidance of a motor vehicle within a parking lot using at least one surroundings sensor arranged within the parking lot. Each surroundings sensor has a scanning plane which defines in each case a virtual wall of a driving corridor for the motor vehicle. The method includes: receiving measuring data signals which represent measuring data of the at least one surroundings sensor, determining, on the basis of the measuring data, whether an object has crossed the virtual wall, generating control signals for the at least partly automated control of a lateral and/or longitudinal guidance of the motor vehicle based on a result of the determination whether at least one object has crossed the virtual wall, and outputting the generated control signals. The invention further relates to a device, a system, a computer program and a machine-readable storage medium.

7 Claims, 3 Drawing Sheets

(51) Int. Cl.
*B60W 60/00* (2020.01)
*G08G 1/16* (2006.01)

(58) Field of Classification Search
CPC ........ G08G 1/0133; G08G 1/04; G08G 1/165; B60W 30/08; B60W 60/0015; B60W 2554/4041
See application file for complete search history.

(56) References Cited

FOREIGN PATENT DOCUMENTS

| | | | | |
|---|---|---|---|---|
| DE | 102015201209 | A1 | | 7/2016 |
| DE | 102015217388 | A1 | | 3/2017 |
| DE | 10 2017212376 | A1 | | 1/2019 |
| DE | 102019114399 | A1 | * | 12/2020 |
| EP | 3333049 | A1 | | 6/2018 |
| JP | 2005024515 | A | | 1/2005 |
| JP | 2015074321 | A | | 4/2015 |
| JP | 2019087161 | A | * | 6/2019 |
| KR | 20120126039 | A | | 11/2012 |

* cited by examiner

METHOD FOR THE AT LEAST PARTLY AUTOMATED GUIDANCE OF A MOTOR VEHICLE

FIELD

The present invention relates to a method for the at least partly automated guidance of a motor vehicle within a parking lot. The present invention relates to a device, a system and a computer program and to a machine-readable storage medium.

BACKGROUND INFORMATION

German Patent Application No. DE 10 2017 212 376 A1 describes a method and a device for detecting a free area within a parking lot.

German Patent Application No. DE 10 2015 201 209 A1 describes a method for automatically moving a vehicle from a transfer zone to an assigned parking space within a predetermined parking area.

German Patent Application No. DE 10 2012 015 968 A1 describes a method for driverlessly moving a vehicle on a parking lot.

SUMMARY

An object of the present invention is to provide the efficient, at least partly automated guidance of a motor vehicle within a parking lot.

This object may be achieved by the present invention. Advantageous embodiments of the present invention are disclosed herein.

According to a first aspect of the present invention, a method is provided for the at least partly automated guidance of a motor vehicle within a parking lot using at least one surroundings sensor arranged within the parking lot, each surroundings sensor having a scanning plane which defines in each case a virtual wall of a driving corridor for the motor vehicle. According to an example embodiment of the present invention, the method includes the following steps:

- receiving measuring data signals which represent measuring data of the at least one surroundings sensor,
- determining, on the basis of the measuring data, whether an object has crossed the virtual wall,
- generating control signals for the at least partly automated control of a lateral and/or longitudinal guidance of the motor vehicle based on a result of the determination whether at least one object has crossed the virtual wall, and
- outputting the generated control signals.

According to a second aspect of the present invention, a device is provided, which is configured to carry out all steps of the method according to the first aspect of the present invention.

According to a third aspect of the present invention, a system is provided for the at least partly automated guidance of a motor vehicle within a parking lot. According to an example embodiment of the present invention, the system comprises:

- at least one surroundings sensor arranged within the parking lot and having a scanning plane which defines a virtual wall of a driving corridor for the motor vehicle, and
- the device according to the second aspect of the present invention.

According to a fourth aspect of the present invention, a computer program is provided, which comprises instructions that, when the computer program is executed by a computer, for example by the device according to the second aspect of the present invention and/or by the system according to the third aspect of the present invention, cause said computer to carry out a method according to the first aspect of the present invention.

According to a fifth aspect of the present invention, a machine-readable storage medium is provided, in which the computer program according to the fourth aspect is stored.

The present invention is based on and includes the knowledge that the above object can be achieved by monitoring the virtual wall defining a longitudinal side of the driving corridor, as to whether an object is crossing said wall. Objects that may pose a potential hazard to the motor vehicle may thus be efficiently detected. Accordingly, the motor vehicle can then, for example, be guided in an at least partly automated manner such that a collision with such an object is avoided. The motor vehicle can thus be advantageously guided efficiently in an at least partly automated manner within a parking lot.

The phrase "at least partly automated guidance" includes one or more of the following cases: assisted guidance, partly automated guidance, highly automated guidance, fully automated guidance.

Assisted guidance means that a driver of the motor vehicle permanently carries out either the lateral or the longitudinal guidance of the motor vehicle. The respectively other driving task (i.e., controlling the longitudinal or lateral guidance of the motor vehicle) is carried out automatically. That is to say, in an assisted guidance of the motor vehicle, either the lateral guidance or the longitudinal guidance is controlled automatically.

Partly automated guidance means that in a specific situation (for example: driving on a highway, driving within a parking lot, overtaking an object, driving within a lane defined by lane markings) and/or for a certain period of time, longitudinal and lateral guidance of the motor vehicle is automatically controlled. A driver of the motor vehicle does not need to manually control the longitudinal and lateral guidance of the motor vehicle. However, the driver must permanently monitor the automatic control of the longitudinal and lateral guidance in order to be able to manually intervene if necessary. The driver must be ready at all times to fully take over motor vehicle guidance.

Highly automated guidance means that for a certain period of time, in a specific situation (for example: driving on a highway, driving within a parking lot, overtaking an object, driving within a lane defined by lane markings), longitudinal guidance and lateral guidance of the motor vehicle are controlled automatically. A driver of the motor vehicle does not need to manually control the longitudinal and lateral guidance of the motor vehicle. The driver does not need to permanently monitor the automatic control of the longitudinal and lateral guidance in order to be able to manually intervene if necessary. If necessary, a take-over request to take over the control of the longitudinal and lateral guidance is automatically output, in particular output with a sufficient time reserve, to the driver. The driver thus must potentially be able to take control of the longitudinal and lateral guidance. Limits of automatically controlling the lateral and longitudinal guidance are detected automatically. In the case of highly automated guidance, it is not possible to automatically bring about a minimum-risk condition in every initial situation.

Fully automated guidance means that in a specific situation (for example: driving on a highway, driving within a parking lot, overtaking an object, driving within a lane defined by lane markings), longitudinal guidance and lateral guidance of the motor vehicle are controlled automatically. A driver of the motor vehicle does not need to manually control the longitudinal and lateral guidance of the motor vehicle. The driver does not need to monitor the automatic control of the longitudinal and lateral guidance in order to be able to manually engage if necessary. Before ending the automatic control of the lateral and longitudinal guidance, the driver is automatically asked to take over the driving task (controlling the lateral and longitudinal guidance of the motor vehicle), in particular with a sufficient time reserve. If the driver does not take over the driving task, it is automatically returned to a minimum-risk condition. Limits of automatically controlling the lateral and longitudinal guidance are detected automatically. In all situations, it is possible to automatically return to a minimum-risk system condition.

According to one example embodiment of the present invention, it is provided that the at least one surroundings sensor is an element selected from the following group of surroundings sensors: radar sensor, lidar sensor, in particular 2D lidar sensor, ultrasonic sensor, video sensor, magnetic field sensor, and infrared sensor.

In one example embodiment of the present invention, it is provided that the at least one object comprises the motor vehicle, wherein the determination, on the basis of the measuring data, whether an object has crossed the virtual wall comprises determining, on the basis of the measuring data, whether the motor vehicle has crossed the virtual wall from the inside in relation to the driving corridor, wherein the control signals are generated based on a result of the determination whether the motor vehicle has crossed the virtual wall from the inside in relation to the driving corridor.

This, for example, may bring about the technical advantage that it can be efficiently detected whether the motor vehicle is at least partially leaving its assigned driving corridor, so that countermeasures can be efficiently taken, for example, in such a case. For example, the control signals may be generated such that, in the case of at least partly automated control of the lateral and/or longitudinal guidance of the motor vehicle based on the output control signals, said motor vehicle is guided back into the driving corridor in an at least partly automated manner. For example, the motor vehicle may be stopped in an at least partly automated manner.

In one example embodiment of the present invention, it is provided that the at least one object comprises an overhang, wherein the determination, on the basis of the measuring data, whether an object has crossed the virtual wall comprises determining, on the basis of the measuring data, whether the overhang has crossed the virtual wall from the outside in relation to the driving corridor, wherein the control signals are generated based on a result of the determination whether the overhang has crossed the virtual wall from the outside in relation to the driving corridor.

This, for example, may bring about the technical advantage that objects projecting from the outside into the driving corridor can be efficiently detected. Such an object, i.e., an overhang, can be a potential collision object for the motor vehicle.

Accordingly, suitable countermeasures can be efficiently taken in such a case. Such countermeasures include, for example, guided stopping in an at least partly automated manner or guided avoiding in an at least partly automated manner based on correspondingly generated control signals.

An overhang in the sense of the description is in particular an object that projects beyond its own base surface. Such an object is, for example, an opened rear flap of a further motor vehicle. Such an object is, for example, an opened tailgate of a further motor vehicle, in particular of a truck.

An overhang in the sense of the description is in particular an object arranged on a further object or comprised by the further object, wherein the overhang projects beyond the base surface of the further object. Such an object is, for example, a bicycle rack or a luggage rack, which is arranged on a further motor vehicle (further object). Such an object is arranged on a roof of a further motor vehicle, for example, and projects in front and/or in the rear beyond the base surface of the further motor vehicle. For example, such an object is partially arranged in a trunk of a further motor vehicle and projects from the trunk beyond the base surface of the further motor vehicle.

An overhang may be referred to as an overhang object.

According to one example embodiment of the present invention, the determination, on the basis of the measuring data, whether an object has crossed the virtual wall comprises comparing the measuring data to reference measuring data.

This, for example, may bring about the technical advantage that the determination can be performed efficiently. For example, the reference measuring data corresponds to a reference measurement when no object is crossing the virtual wall. By comparing the measuring data with the reference measuring data, a change in the virtual wall in particular can then be detected. For example, an object crossing the virtual wall is detected if a change is detected. For example, it is determined that no object is crossing the virtual wall if no change is detected.

According to one example embodiment of the present invention, it is provided that the virtual wall is divided into a plurality of wall portions that extend along the driving corridor, wherein the determination, on the basis of the measuring data, whether an object has crossed the virtual wall comprises selecting at least one of the wall portions depending on a movement of the motor vehicle, wherein it is determined, only for the at least one selected wall portion, whether an object has crossed the at least one selected wall portion, so that it is not determined, for the non-selected wall portions, whether an object has crossed the non-selected wall portions.

This, for example, may bring about the technical advantage that the determination can be performed efficiently. For example, no wall portions need to be selected that are behind the motor vehicle in relation to a direction of travel of the motor vehicle. Objects that project through the wall portion into the driving corridor behind the motor vehicle in relation to the direction of travel do not typically pose a danger to the motor vehicle, at least not an immediate danger.

The determination can thus, for example, be performed in a time-efficient and processor-efficient manner, i.e., in a computationally efficient manner.

According to one example embodiment of the present invention, the method according to the first aspect is a computer-implemented method.

According to one example embodiment of the present invention, the method according to the first aspect is executed or performed by means of the device according to the second aspect of the present invention.

Technical functionalities of the device according to the second aspect and/or of the system according to the third aspect result directly from corresponding technical functionalities of the method according to the first aspect, and vice versa. So, in particular, the device features and/or system features result from corresponding method features, and vice versa.

In one example embodiment of the present invention, the surroundings sensor is arranged on a ceiling of the parking lot.

In one example embodiment of the present invention, the surroundings sensor is arranged on a pillar of the parking lot.

According to one example embodiment of the present invention, the virtual wall is perpendicular or non-perpendicular to a roadway or a driving surface, generally to a floor of the parking lot.

According to one example embodiment of the present invention, the method according to the first aspect comprises at least partly automated control of the lateral and/or longitudinal guidance of the motor vehicle based on the output control signals.

According to one example embodiment of the present invention, the at least partly automated control of the lateral and/or longitudinal guidance of the motor vehicle comprises remotely controlling the lateral and/or longitudinal guidance of the motor vehicle.

The phrase "at least one" also includes the phrase "one or more." A plurality of surroundings sensors are, for example, identical surroundings sensors or are, for example, different surroundings sensors. In the case of multiple surroundings sensors, one or more surroundings sensors are, for example, arranged on a ceiling of the parking lot and/or one or more surroundings sensors are, for example, each arranged on a pillar of the parking lot. According to one embodiment, a plurality of surroundings sensors are arranged spatially distributed within the parking lot. The surroundings sensor is, for example, arranged stationary within the parking lot.

In the case of a plurality of surroundings sensors, in one example embodiment of the present invention, the surroundings sensors are arranged such that the virtual walls defined by means of the respective scanning plane delimit the driving corridor in the longitudinal direction on both sides. Thus, a first virtual wall and a second virtual wall opposite the first virtual wall are, for example, provided and delimit the driving corridor in the longitudinal direction, wherein the first and the second virtual wall are parallel to one another, for example.

Exemplary embodiments of the present invention are illustrated in the figures and explained in more detail in the following description.

DETAILED DESCRIPTION OF EXAMPLE EMBODIMENTS

Figure 1:
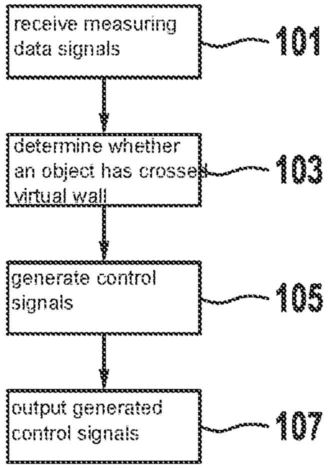
FIG. 1 shows a flow diagram of a method for the at least partly automated guidance of a motor vehicle, according to an example embodiment of the present invention.

FIG. 1 shows the flow chart of a method for the at least partly automated guidance of a motor vehicle within a parking lot using at least one surroundings sensor arranged within the parking lot, each surroundings sensor having a scanning plane which defines in each case a virtual wall of a driving corridor for the motor vehicle, said method comprising the following steps:

- receiving 101 measuring data signals which represent measuring data of the at least one surroundings sensor,
- determining 103, on the basis of the measuring data, whether an object has crossed the at least one virtual wall,
- generating 105 control signals for the at least partly automated control of a lateral and/or longitudinal guidance of the motor vehicle based on a result of the determination whether at least one object has crossed the at least one virtual wall, and
- outputting 107 the generated control signals.

Figure 2:
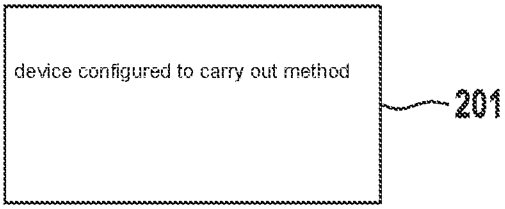
FIG. 2 shows a device according to an example embodiment of the present invention.

FIG. 2 shows a device 201, which is configured to carry out all steps of the method according to the first aspect.

Figure 3:
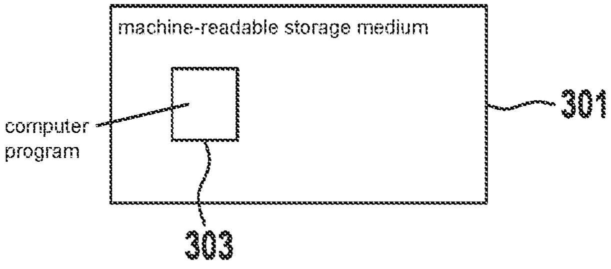
FIG. 3 shows a machine-readable storage medium according to an example embodiment of the present invention.

FIG. 3 shows a machine-readable storage medium 301, in which a computer program 303 is stored. The computer program 303 comprises instructions that, when the computer program 303 is executed by a computer, cause the latter to carry out a method according to the first aspect.

Figure 4:
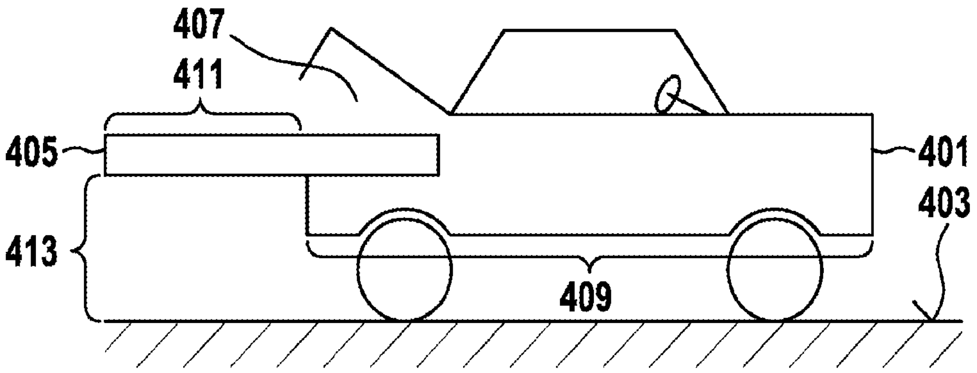
FIG. 4 shows an overhang.

FIG. 4 shows a motor vehicle 401, which is parked in a parking space 403. The motor vehicle 401 transports an object in its trunk 407, the object 405 projecting out of the trunk 407.

A base surface of the motor vehicle 401 is marked with a curly bracket with reference sign 409.

The object 405 projects with an overhang length 411 beyond this base surface 409, wherein this overhang length 411 is marked with a curly bracket.

A height of the object 405 in relation to the parking space 403 is marked with a curly bracket with the reference sign 413.

The object 405 thus projects beyond the base surface 409 of the motor vehicle 401. In the sense of the description, the object 405 is an overhang.

Motor vehicles passing the motor vehicle 401 may, for example, collide with the object 405.

There is thus a need to detect such overhangs 405.

This is made possible according to the concept described herein.

Figure 5:
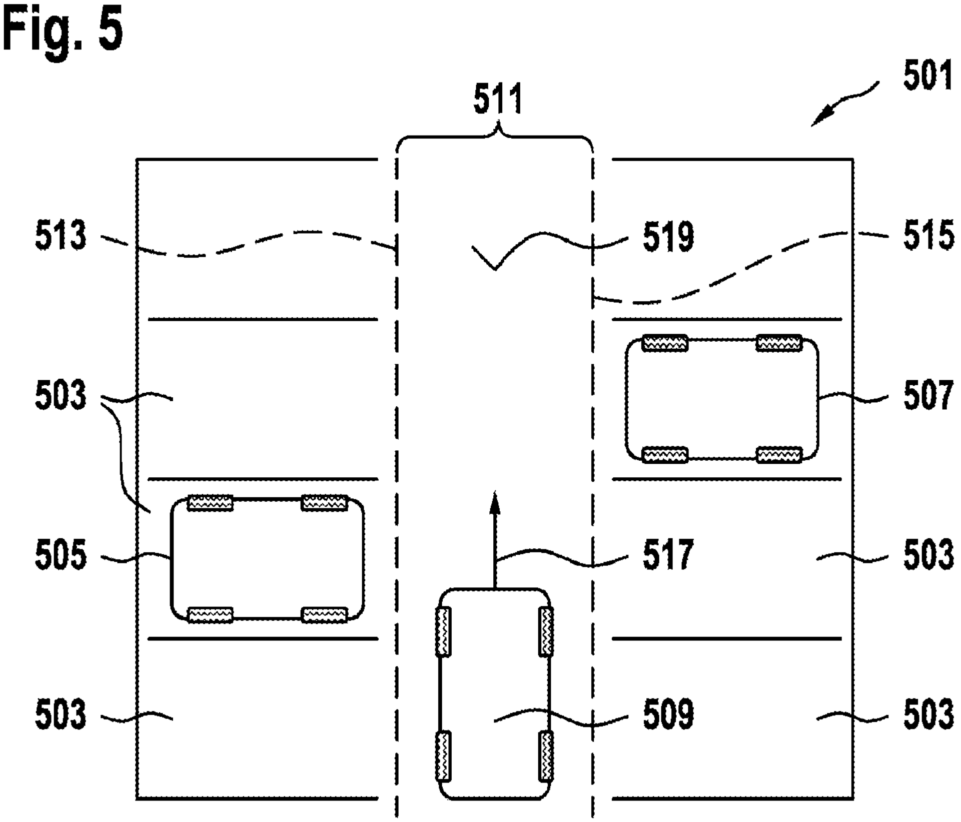
FIG. 5 shows a parking lot.

FIG. 5 shows a parking lot 501 comprising a plurality of parking spaces 503. A first motor vehicle 505 and a second motor vehicle 507 are parked in the plurality of parking spaces 503.

A third motor vehicle 509 travels between the two parking motor vehicles 505, 507 in search of a free parking space, for example, or toward an exit (not shown) of the parking lot 501. The third motor vehicle 509 is, for example, guided in an at least partly automated manner.

A driving corridor 511 is defined or established, which is marked by means of a curly bracket. For the sake of clarity, two dashed lines are drawn, which limit the driving corridor 511 on both sides, i.e., left and right in relation to the paper plane. The left dashed line is provided with reference sign 513 and the right dashed line is provided with reference sign 515.

The third motor vehicle 509 travels in the direction of travel, marked by an arrow with the reference sign 517, in the driving corridor 511.

For example, if the first motor vehicle 503 or the second motor vehicle 507 were transporting a corresponding overhang object in its trunk, analogously to the motor vehicle 401 according to FIG. 4, the third motor vehicle 517 could collide with this overhang object.

In this respect, according to the concept described herein, it is provided that surroundings sensors are arranged spatially distributed within the parking lot 501, wherein these surroundings sensors each have a scanning plane, which defines a virtual wall. For the sake of clarity, these surroundings sensors are not shown in FIG. 5. For an exemplary arrangement, reference is made to FIG. 7.

FIG. 5 shows a schematic top view of the parking lot 501. For example, the virtual walls are perpendicular to a floor 519 of the parking lot 501 and each extend along the left and right dashed lines 513, 515, thus virtually delimiting the driving corridor 511 in the longitudinal direction.

Figure 6:
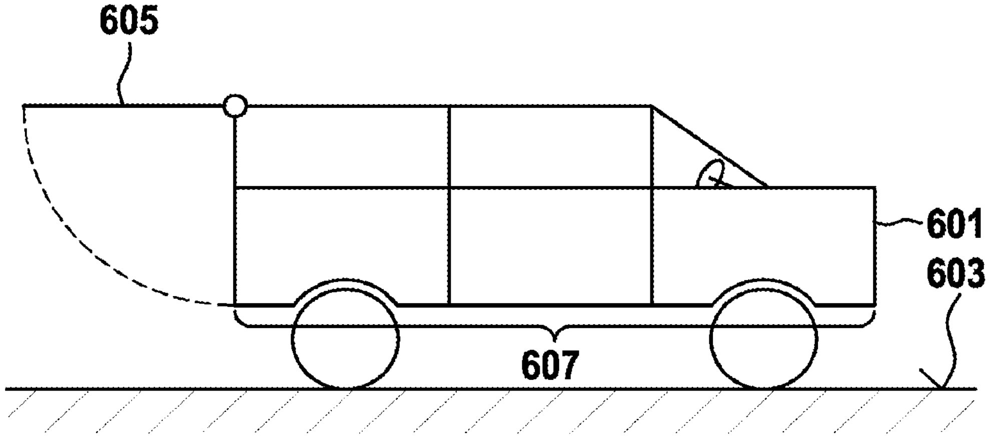
FIG. 6 shows a further overhang.

FIG. 6 shows a motor vehicle 601, in particular a VAN (minivan), which is parked in a parking space 603. The motor vehicle 601 comprises a trunk flap 605, which is in an open position. The open trunk flap 605 thus projects beyond a base surface 607 of the motor vehicle 601 and is thus an overhang according to the description.

Figure 7:
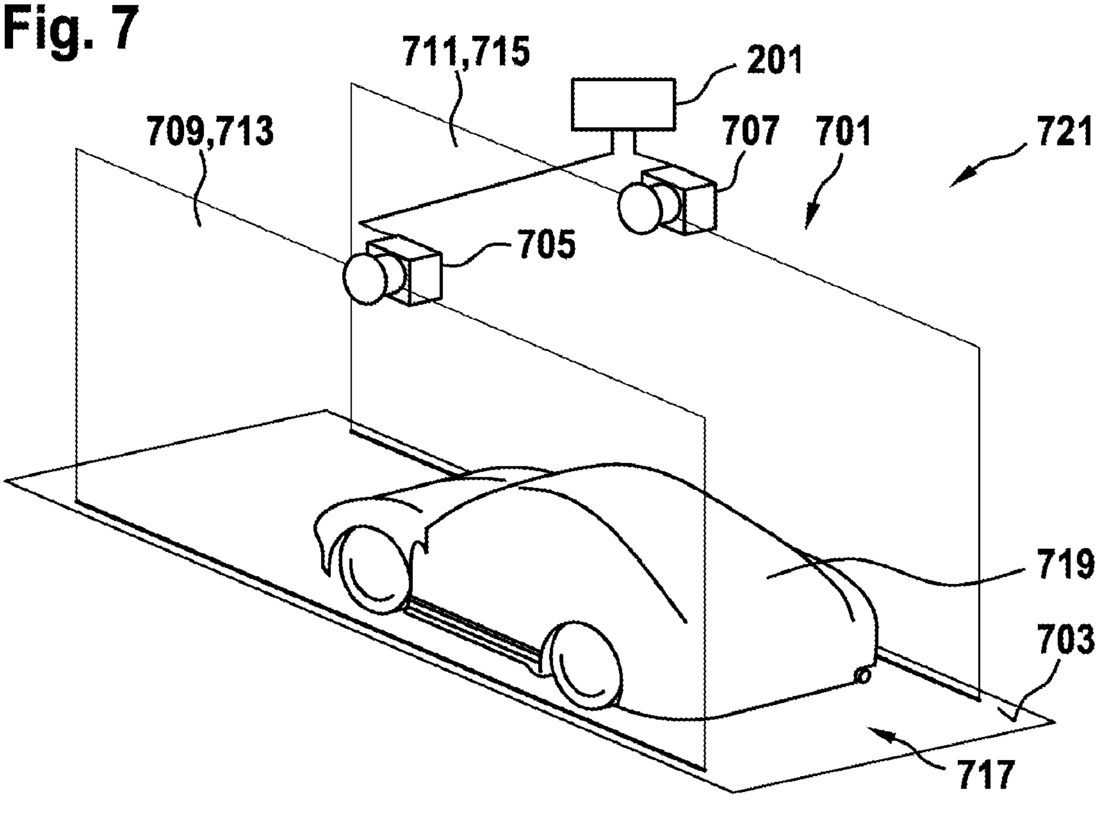
FIG. 7 shows a system for the at least partly automated guidance of a motor vehicle, according to an example embodiment of the present invention.

FIG. 7 shows a parking lot 701. The parking lot 701 comprises a driving surface 703 for motor vehicles.

The parking lot 701 comprises a first surroundings sensor 705 and a second surroundings sensor 707, which are arranged spatially distributed within the parking lot 701. The first surroundings sensor 705 is, for example, a lidar sensor, e.g., a 2D lidar sensor. The second surroundings sensor 707 is, for example, a lidar sensor, e.g., a 2D lidar sensor.

For example, the two surroundings sensors 705, 707 are each arranged on a pillar (not shown) of the parking lot 701. For example, the two surroundings sensors 705, 707 are arranged on a ceiling (not shown) of the parking lot 701.

The first surroundings sensor 705 has a first scanning plane 709. The second surroundings sensor 707 has a second scanning plane 711.

The two scanning planes 709, 711 preferably extend perpendicularly to the driving surface 703. The first scanning plane 709 establishes or defines a first virtual wall 713

The second scanning plane 711 establishes or defines a second virtual wall 715.

The two virtual walls 713, 715 thus virtually delimit a driving corridor 717 in the longitudinal direction, in which a motor vehicle 719 can be guided in an at least partly automated manner.

The device 201 according to FIG. 2 is furthermore provided, which is connected to the two surroundings sensors 705, 707. In this respect, the two surroundings sensors 705, 707 may provide their respective measuring data signals to the device 201.

By means of the device 201, it is now possible to determine, on the basis of the measuring data, whether an object has crossed the first virtual wall 713 and/or the second virtual wall 715, for example. Based on a corresponding result, the device 201 generates control signals for the at least partly automated control of a lateral and/or longitudinal guidance of the motor vehicle 719. The device 201 subsequently outputs the generated control signals. For example, the generated control signals are output to a wireless communication interface (not shown) by means of which the generated control signals can be sent as remote control signals to the motor vehicle 719.

It is thus advantageously possible to detect objects that are crossing the virtual walls 713, 715 from the outside in relation to the driving corridor 717. Furthermore, it is advantageously possible to detect if the motor vehicle 719 is crossing one or both of the virtual walls 713, 715 from the inside in relation to the driving corridor 717. For example, it may advantageously be detected if the motor vehicle 719 is leaving a predetermined target trajectory and is traveling out of the driving corridor 717. Correspondingly generated control signals for the at least partly automated control of a lateral and/or longitudinal guidance of the motor vehicle 719 can then be such, for example, that, in the case of at least partly automated control of the lateral and/or longitudinal guidance of the motor vehicle 719, the motor vehicle 719 travels back into the driving corridor 717 based on these control signals.

In one embodiment, it is provided that the measuring data is compared to reference measuring data, wherein the reference measuring data describes or characterizes a virtual wall 713, 715 that is not crossed by an object. For example, if the measuring data changes in relation to the reference measuring data, it may, for example, be determined that an object has crossed the corresponding virtual wall 713, 715.

In one embodiment, it is provided that the method is performed only if a motor vehicle that is guided in a partly automated manner is in a proximity to the at least one surroundings sensor.

A maximum height and/or density of the surroundings sensors depend on the surroundings sensor specifications, for example. A predetermined distance from the sides of the motor vehicle is, for example, selected based on safety specifications of the system. For example, the predetermined distance depends on a permitted or allowable length of an overhang and/or on a maximum allowable speed of further motor vehicles and/or pedestrians and/or on a maximum allowable deviation of the motor vehicle, guided in an at least partly automated manner, from a target trajectory.

In this respect, FIG. 7 shows a system 721 for the at least partly automated guidance of a motor vehicle within a parking lot, wherein the system 721 comprises the two surroundings sensors 705, 707 and the device 201.

The invention claimed is:

1. A method for an at least partly automated guidance of a motor vehicle within a parking lot, the method being performed in an environment that includes a plurality of surroundings sensors arranged within the parking lot, each surroundings sensor of the plurality of scanning sensors having a respective scanning plane which defines a respective virtual wall of a driving corridor for the motor vehicle, the method comprising the following steps:

receiving measuring data signals which represent measuring data of the plurality of surroundings sensors;

determining, based on the measuring data, whether an object has crossed at least one of the respective virtual walls, wherein the at least one object comprises an overhang projecting beyond a base surface of a further object, and wherein the determination comprises detecting whether the overhang has crossed the at least one of the respective virtual walls from outside in relation to the driving corridor; and generating control signals for at least partly automated control of a lateral and/or longitudinal guidance of the motor vehicle based on a result of the determination of whether the overhang has crossed the at least one of the respective virtual walls from outside the driving corridor; and outputting wirelessly the generated control signals to the motor vehicle as remote control signals, the remote control signals controlling the lateral and/or longitudinal guidance of the motor vehicle, wherein the plurality of surroundings sensors are arranged such that the respective scanning planes of the plurality of surroundings sensors define opposite virtual walls that delimit the driving corridor in a longitudinal direction, and wherein the opposite virtual walls are substantially parallel to one another.

2. The method according to claim 1, wherein the at least one object includes the motor vehicle, wherein the determination, based on the measuring data, of whether an object has crossed the at least one of the respective virtual walls includes determining, based on the measuring data, whether the motor vehicle has crossed the at least one of the respective virtual walls from inside in relation to the driving corridor, wherein the control signals are generated based on a result of the determination whether the motor vehicle has crossed the at least one of the respective virtual walls from the inside in relation to the driving corridor.

3. The method according to claim 1, wherein the determination, based on the measuring data, of whether an object has crossed the at least one of the respective virtual walls includes comparing the measuring data to reference measuring data.

4. The method according to claim 1, wherein each of the respective virtual walls is divided into a plurality of wall portions that extend along the driving corridor, wherein the determination, based on the measuring data, of whether an object has crossed the at least one of the respective virtual walls, includes selecting at least one of the wall portions based on a movement of the motor vehicle along the driving corridor, wherein it is determined, only for the at least one selected wall portion, whether an object has crossed the at least one selected wall portion, so that it is not determined, for non-selected wall portions, whether an object has crossed the non-selected wall portions.

5. A device configured for an at least partly automated guidance of a motor vehicle within a parking lot using a plurality of surroundings sensors arranged within the parking lot, each surroundings sensor of the plurality of surroundings sensors having a respective scanning plane which defines a respective virtual wall of a driving corridor for the motor vehicle, the device comprising a computer and a machine-readable storage medium on which is stored a computer program, the computer program, when executed by the computer, causing the computer to perform the following steps:

receiving measuring data signals which represent measuring data of the plurality of surroundings sensors;

determining, based on the measuring data, whether an object has crossed at least one of the respective virtual walls, wherein the at least one object comprises an overhang projecting beyond a base surface of a further object, and wherein the determination comprises detecting whether the overhang has crossed the at least one of the respective virtual walls from outside in relation to the driving corridor; and generating control signals for at least partly automated control of a lateral and/or longitudinal guidance of the motor vehicle based on a result of the determination of whether the overhang has crossed the at least one of the respective virtual walls from outside the driving corridor; and outputting wirelessly the generated control signals to the motor vehicle as remote control signals, the remote control signals controlling the lateral and/or longitudinal guidance of the motor vehicle, wherein the plurality of surroundings sensors are arranged such that the respective scanning planes of the plurality of surroundings sensors define opposite virtual walls that delimit the driving corridor in a longitudinal direction, and wherein the opposite virtual walls are substantially parallel to one another.

6. A system for an at least partly automated guidance of a motor vehicle within a parking lot, comprising:

a plurality of surroundings sensor arranged within the parking lot each surroundings sensor of the plurality of surroundings sensors having a respective scanning plane which defines a respective virtual wall of a driving corridor for the motor vehicle; and a device comprising a computer and a machine-readable storage medium on which is stored a computer program, the computer program, when executed by the computer, causing the computer to perform the following steps:

receiving measuring data signals which represent measuring data of the plurality of surroundings sensors, determining, based on the measuring data, whether an object has crossed at least one of the respective virtual walls, wherein the at least one object comprises an overhang projecting beyond a base surface of a further object, and wherein the determination comprises detecting whether the overhang has crossed the at least one of the virtual walls from outside in relation to the driving corridor; and generating control signals for at least partly automated control of a lateral and/or longitudinal guidance of the motor vehicle based on a result of the determination of whether the overhang has crossed the virtual wall from outside the driving corridor; and outputting wirelessly the generated control signals to the motor vehicle as remote control signals, the remote control signals controlling the lateral and/or longitudinal guidance of the motor vehicle, wherein the plurality of the at least one surroundings sensors are arranged such that the scanning planes of the plurality of surroundings sensors define opposite virtual walls that delimit the driving corridor in a longitudinal direction, and wherein the opposite virtual walls are substantially parallel to one another.

7. A non-transitory machine-readable storage medium on which is stored a computer program for an at least partly automated guidance of a motor vehicle within a parking lot using a plurality of surroundings sensors arranged within the parking lot, each surroundings sensor of the plurality of surroundings sensor having a respective scanning plane which defines a respective virtual wall of a driving corridor for the motor vehicle, the computer program, when executed by a computer, causing the computer to perform the following steps:

receiving measuring data signals which represent measuring data of the plurality of surroundings sensors;

determining, based on the measuring data, whether an object has crossed at least one of the respective virtual walls, wherein the at least one object comprises an overhang projecting beyond a base surface of a further object, and wherein the determination comprises detecting whether the overhang has crossed the at least one of the virtual walls from outside in relation to the driving corridor of the motor vehicle; and generating control signals for at least partly automated control of a lateral and/or longitudinal guidance of the motor vehicle based on a result of the determination of whether the overhang has crossed the at least one of the virtual walls from outside the driving corridor; and outputting wirelessly the generated control signals to the motor vehicle as remote control signals, the remote control signals controlling the lateral and/or longitudinal guidance of the motor vehicle, wherein the plurality of surroundings sensors are arranged such that the respective scanning planes of the plurality of surroundings sensors define opposite virtual walls that delimit the driving corridor in a longitudinal direction, and wherein the opposite virtual walls are substantially parallel to one another.

* * * * *